United States Patent [19]

Loveland

[11] Patent Number: 5,049,730
[45] Date of Patent: Sep. 17, 1991

[54] AUTOMATIC SHUTTER FOR LOW LIGHT SENSING AND AMPLIFYING DEVICE

[75] Inventor: Radon B. Loveland, Las Cruces, N. Mex.

[73] Assignee: The United States of America as represented by the Secretary of the Army, Washington, D.C.

[21] Appl. No.: 513,734

[22] Filed: Apr. 23, 1990

[51] Int. Cl.⁵ .................. H01J 31/50; H01J 40/14
[52] U.S. Cl. ....................... 250/213 VT; 250/207; 250/201.1
[58] Field of Search .......... 250/213 VT, 207, 213 VT

[56] References Cited

U.S. PATENT DOCUMENTS

| 3,557,373 | 1/1971 | Hess | 250/207 |
|---|---|---|---|
| 4,176,919 | 12/1979 | Rast, Jr. | 350/354 |
| 4,314,743 | 2/1982 | Rast | 350/354 |
| 4,695,718 | 9/1987 | Dill | 250/213 VT |

FOREIGN PATENT DOCUMENTS 5838442  3/1981  Japan ........................ 250/213 VT

OTHER PUBLICATIONS

Motorola Technical Brochure, Motorola Inc. Components Division, "PLZT Electro-Optic Devices SCS Solid Ceramic Shutters," 1987.
Motorola Technical Brochure, Motorola Inc. Components Division, "SCS 1108A Solid Ceramic Shutter," 1988.
Motorola Technical Brochure, Motorola Inc. Components Division, "PLZT Shutter, Model SCS 1108A Drive Application Note," 1988.

Primary Examiner—David C. Nelms
Assistant Examiner—T. Davenport
Attorney, Agent, or Firm—Saul Elbaum; Guy M. Miller

[57] ABSTRACT

A low light sensing and amplifying device uses an automatically adjustable electro-optic shutter that quantitatively attenuates the amount of monitored electromagnetic energy impinging on a light processor in proportional relation to the electromagnetic energy's intensity. An output signal from the light processor controls the output of a power supply which provides an output supply signal to the electro-optic shutter.

10 Claims, 2 Drawing Sheets

AUTOMATIC SHUTTER FOR LOW LIGHT SENSING AND AMPLIFYING DEVICE

RIGHTS OF THE GOVERNMENT

The invention described herein may be manufactured, used and licensed by or for the United States Government for Governmental purposes without payment to me of any royalty thereon.

BACKGROUND OF THE INVENTION

1. Field of the Invention

The present invention relates to low level light sensing and amplifying devices and, more particularly, to low level light detectors having a quantitative protection device for protecting the detectors such as photomultiplier tubes from high intensity input while providing large dynamic range.

2. Description of the Prior Art

Under battlefield conditions, ambient light intensities can vary from brilliant sunlight to intensities that are lower than light provided by starlight, a range of more than seven orders of magnitude. Under some conditions low level light sensing devices, such as night vision devices, that operate in the visible or near infrared may be marginal in performance because ambient light illumination is very low. A device that can measure low levels of light intensity and that can function over a wide dynamic range and survive is needed to permit judgments about the trafficability of military vehicles using night vision devices. There is some evidence that some night vision devices lose sensitivity after prolonged periods of operation; therefore, it is important to know when the ambient light level is marginally low for tactical operations The Geophysical Advisory Service of the West German armed forces has divided ambient light levels into six categories (shown in Table 1) that reflect different levels of troop mobility.

TABLE 1

| NIGHT BRIGHTNESS CATEGORY VERSUS ILLUMINATION LEVEL | | |
|---|---|---|
| Category | Light Level (mlx) | Orientation Potential |
| 1 | 300 to 140 | Satisfactory |
| 2 | 139 to 40 | Still adequate |
| 3 | 39 to 5 | Impeded |
| 4 | 4.9 to 2 | Substantially Impeded |
| 5 | 1.9 to 1.0 | Strongly Impeded |
| 6 | <1.0 | None |

The lower bound which reflects any interest in troop mobility appears to be about 2.0 millilux (mlx). The equipment must also survive in daylight, which is about $10^7$ mlx. In view of this very large range of light levels and the small number of categories, there is a need for a light measuring system of moderate accuracy and large dynamic range.

Ordinary silicon diodes do not provide reasonable signal-to-noise ratios under the lowest light levels without the use of detector cooling or mechanical choppers. Both approaches are deemed unsuitable for tactical applications. Photomultiplier tubes have adequate sensitivity down to 0.1 mlx but are degraded by exposure to direct sunlight. There is also the requirement for covering a large dynamic range. Consequently, there is a need for a device that can sense and amplify light intensities over a wide range that do not degrade when exposed to direct sunlight.

SUMMARY OF THE INVENTION

It is therefore a primary object of the invention to provide a low level ambient light sensing and amplifying device that is not degraded by the exposure to high intensity sunlight.

It is a further object of the invention to provide an ambient light sensing and amplifying device that is not degraded by the exposure to high intensity sunlight and operates over a wide dynamic range.

It is still a further object of the invention to provide an ambient light amplifying device that can operate over a wide dynamic range and quantitatively adjust exposure to the device as a function of the light intensity present.

The foregoing and other objects are attained in accordance with the invention through the use of a circuit arrangement that includes a power supply, light processing means which includes a photomultiplier tube, and an automatically adjustable attenuator for limiting the amount of light that impinges on the photomultiplier tube such as an electro-optic shutter. The electro-optic shutter, which is responsive to an output supply signal from the power supply, controls the amount of light transmitted to the photomultiplier tube in proportional relation to the output supply signal. An output signal generated by the photomultiplier tube, which is proportional to the incident light impinging thereon, is used to control the output supply signal of the power supply. The output supply signal of the power supply causes the electro-optic shutter to attenuate the light transmitted to the photomultiplier in proportional relation to the output signal.

Figure 1:
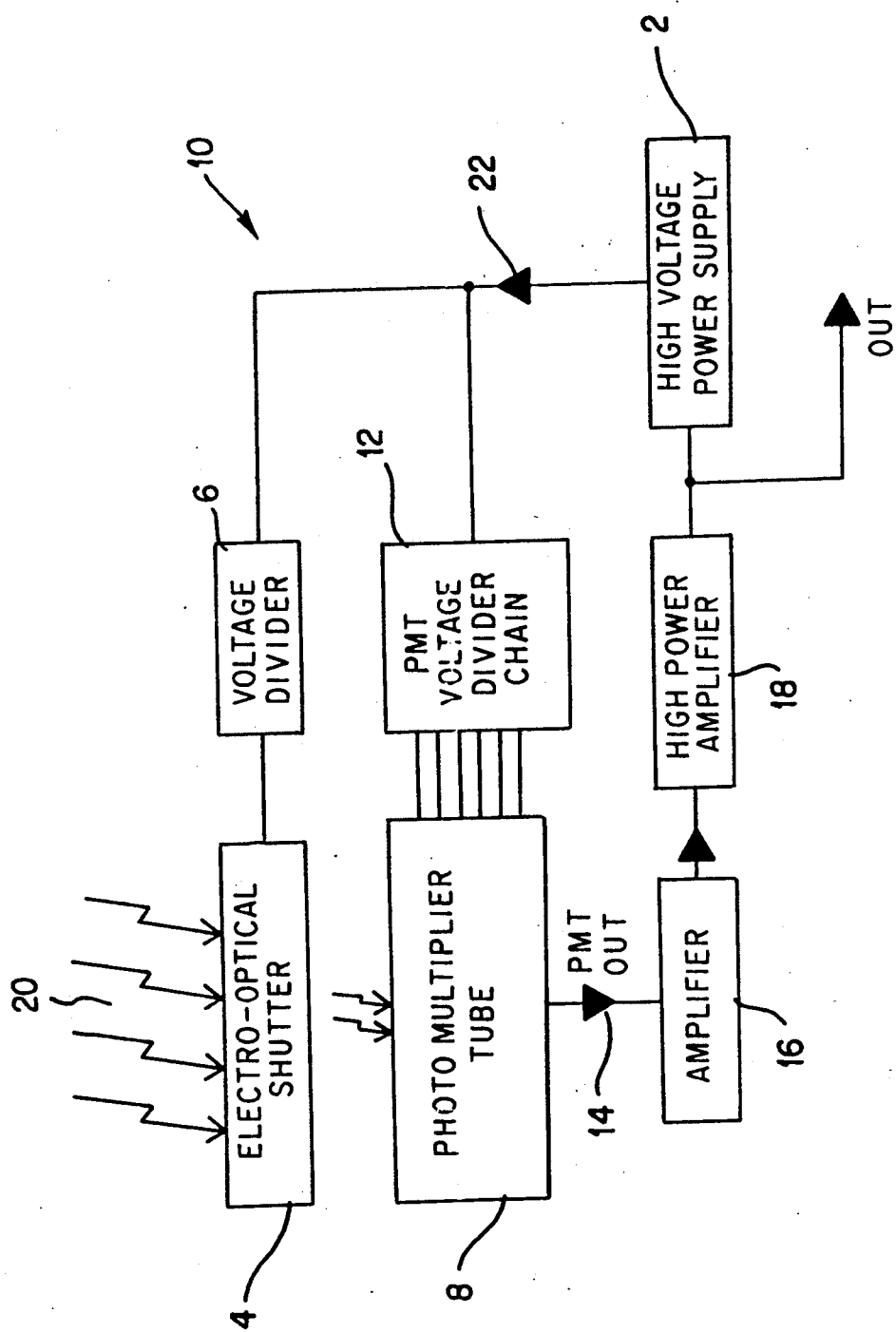
FIG. 1 shows a block diagram of a wide range optical amplifying and protection device according to an embodiment of the invention.

The foregoing and other objects, aspects, uses and advantages of the present invention will be more fully appreciated as the same becomes better understood when considered in connection with the following detailed description of the present invention and in conjunction with the accompanying drawings, in which:

DESCRIPTION OF THE PREFERRED EMBODIMENTS

Referring now to the drawings, like reference numerals represent identical or corresponding parts throughout the several views.

Figure 2:
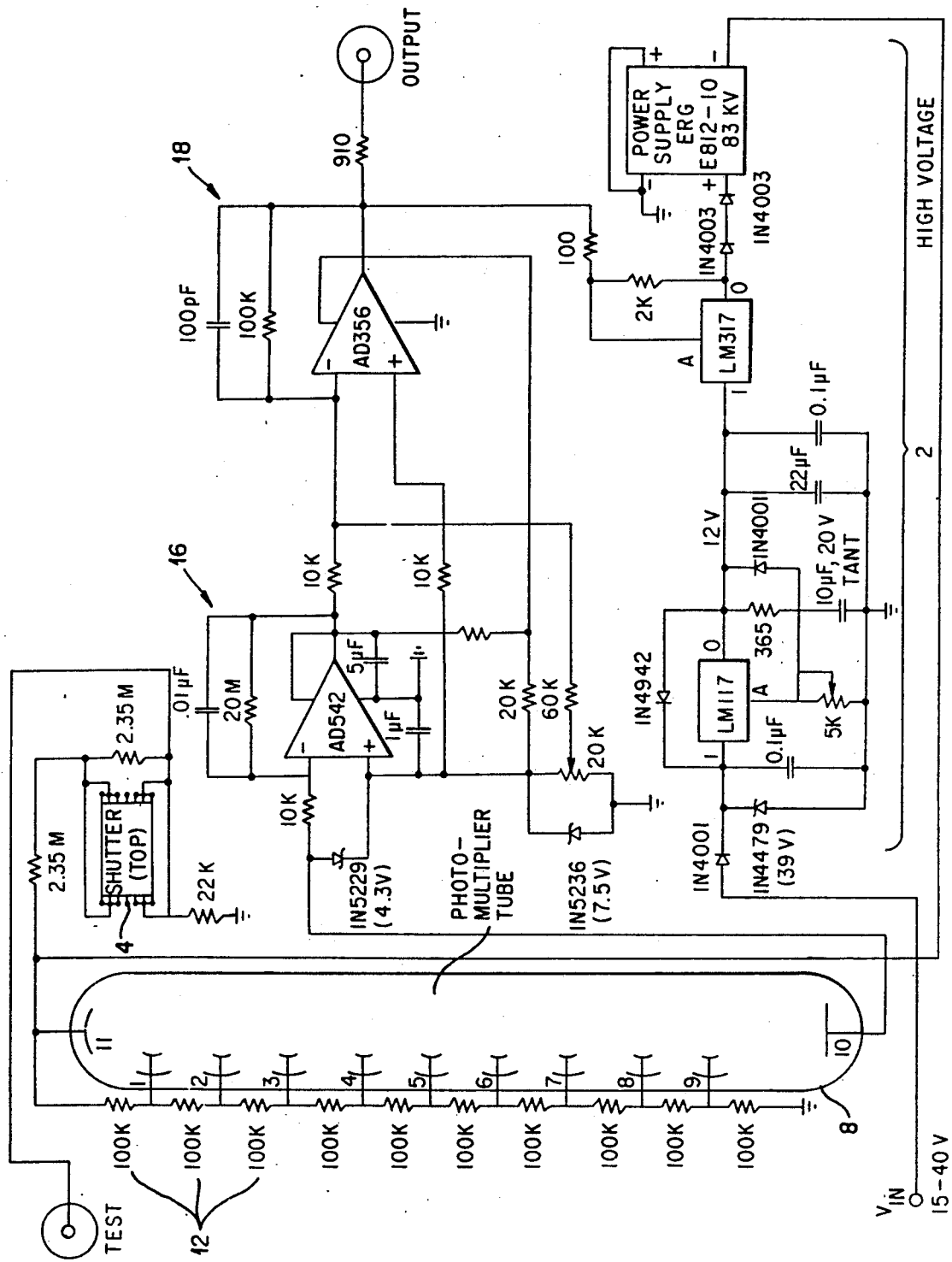
FIG. 2 shows an electrical schematic diagram of a wide range optical amplifying and protection device according to an embodiment of the invention.

FIG. 1 shows a block diagram of a wide range optical sensing and amplifying device 10. A power supply 2 provides power to an electro-optic shutter 4 through a voltage divider 8 and to a photomultiplier tube 8 through a voltage divider chain 12. An output signal 14 from the photomultiplier tube 8 is transmitted through amplifiers 10 and 18 to the power supply 2. While a single power supply 2 is shown a separate power supply (not shown) could be used for powering the photomultiplier tube 8. In that case the output signal from the photomultiplier tube 8 would not be transmitted to the separate power supply. The circuit shown in FIG. 2 provides a more detailed layout with actual components, all of which are well known. For example, an RCA 931 photomultiplier tube with a Cesium-Antimony cathode ma be used as the photomultiplier tube 8 and a Motorola Solid Ceramic Shutter (SCS) model SCS 1108A may be used as the electro-optic shutter 4.

Electromagnetic energy, such as light 20, impinges on the photomultiplier tube 8 after it passes through the electro-optic shutter 4. As the electromagnetic energy (light intensity) increases the output signal 14 from the photomultiplier tube 8, which is connected to the power supply 2 through amplifiers 16 and 18, causes the power supply 2 to output a supply signal 22 that makes the electro-optic shutter 4 polarize thus attenuating the light 20 transmitted therethrough in proportional relation. The electro-optic shutter 4 consists of a sandwich of crossed polarizers and a special ceramic that has the property of polarization rotation when a voltage is applied. In the present invention, 90 degrees polarization rotation is obtained with about 500 volts across the ceramic. In other words, with 500 volts applied the electro-optic shutter is at its most transparent and attenuates the electromagnetic energy the least. With no voltage applied the electro-optic shutter is opaque and attenuates the electromagnetic energy the most. Thus, the electro-optic shutter 4, through the control of the supply signal 22, provides an automatically adjustable light attenuator that attenuates in proportional relation to the level of light intensity impinging on the photo-multiplier tube 8. The photo-multiplier tube 8 is, therefore, not degraded by direct high intensity light.

Obviously, numerous modifications and variations of the present invention are possible in light of the above teachings. For example, nonlinear responses in the photomultiplier tube due to temperature swings may require the addition of compensation circuits. Calibration curves can provide the data for making appropriate adjustments. It is therefore to be understood that within the scope of the appended claims, the invention may be practiced otherwise than as specifically described herein.

What is claimed is:

1. A device for automatically and adjustably limiting increasing amounts of monitored electromagnetic energy from impinging on a processing device comprising;
   a power supply having a supply signal;
   electromagnetic energy processing means for sensing and amplifying the monitored electromagnetic energy;
   attenuating means, interposed between the monitored electromagnetic energy and said electromagnetic energy processing means and responsive to the supply signal from said power supply, for attenuating the monitored electromagnetic energy transmitted therethrough, said electromagnetic energy processing means transmitting an output signal to said power supply so that as the monitored electromagnetic energy increases the output signal causes said attenuating means to attenuate the electromagnetic energy transmitted therethrough in a direct proportional relation.

2. The device of claim 1 wherein said electromagnetic energy processing means comprises a photomultiplier tube which outputs the output signal.

3. The device of claim 2 wherein said electromagnetic energy processing means further comprises an amplifier for amplifying the output signal.

4. The device of claim 1 wherein said attenuating means comprises an electro-optic shutter.

5. The device of claim 1 wherein said electromagnetic energy processing means is powered by the supply signal from said power supply.

6. A device for sensing and amplifying a wide range of light intensities comprising;
   a power supply having a supply signal;
   an electro-optic shutter, responsive to the supply signal, for controlling the light intensities transmitted therethrough; and
   light processing means for sensing and amplifying the light transmitted through said electro-optic shutter, said light processing means transmitting an output signal, which is proportional to the light intensities transmitted through said electro-optic shutter, to control the supply signal of said power supply so that as light intensities increase the supply signal of said power supply causes said electro-optic shutter to attenuate the light transmitted therethrough in a direct proportional relation.

7. The device of claim 6 wherein said light processing means comprises a photomultiplier tube which outputs the output signal.

8. The device of claim 7 wherein said light processing means further comprises an amplifier for amplifying the output signal from said photomultiplier tube.

9. The device of claim 6 wherein said electro-optic shutter becomes decreasingly transparent in proportional relation to the supply signal.

10. The device of claim 6 wherein said light processing means is powered by the supply signal from said power supply.

* * * * *